United States Patent Office 3,010,829
Patented Nov. 28, 1961

3,010,829
PROCESSES FOR PREPARING MEAT PRODUCTS
Earl W. Turner, Park Forest, Ill., assignor to International Packers Limited, Chicago, Ill., a corporation of Delaware
No Drawing. Filed Dec. 24, 1959, Ser. No. 861,774
5 Claims. (Cl. 99—107)

This invention relates to meat products and processes for preparing same, and more particularly, to meat products containing acid soluble constituents.

Meat extract has been used for many years as a food in the form of beef tea, bouillion, etc. and also to impart a desirable flavor to other foods. It is manufactured by soaking, or cooking, meat in hot water and then concentrating the meat soup thus obtained. The yield of meat extract resulting from cooking meat in water is only 2% to 4%, depending upon the particular meat used and the conditions used for extraction. Due to the wide spread use of meat extract as a flavoring agent and because of the relatively low yield (2% to 4%) by conventional methods of manufacture, there is an inadequate supply available.

While meat extract contains water soluble nitrogenous components and vitamins, including B-complex, many of the nutritionally essential amino acids found in meat are not present. The essential amino acids are chemically linked to the protein molecules, so that they are not removed simply by water extraction.

It is, therefore, an object of the present invention to produce meat products. It is a further object of the invention to obtain products from meat which contain larger amounts of the nutritionally essential amino acids than have been found in the conventional extract. It is yet a further object of the invention to provide a meat product of improved flavor by the inclusion of additional meat components. It is a still further object of the invention to produce products from meat with increased yields. It is another object of the invention to produce a meat product which contains the nutritionally essential amino acids found in meat. It is still another object of the invention to provide a meat product that is inexpensive compared with the conventional meat extract. To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principles of the invention may be employed.

Briefly stated, the present invention is concerned with a process for producing meat products which comprises extracting nutritional constituents therefrom by treatment with a mineral acid. In its broadest aspects the invention also pertains to the products obtained by the process.

More particularly, the invention is concerned with extracting water soluble constituents, treating the water insoluble residue with a mineral acid to form an acid soluble fraction, and combining the water soluble and acid soluble fractions so that the resultant product contains increased amounts of nutritional components, as well as possessing an improved flavor.

The meat employed in the process is the skeletal tissue of animals. Beef, pork, poultry, mutton, whale meat, and the like, are typical examples of meats which may be used. Various cuts of meat may be employed including the full carcass, or special economy cuts, such as head meats, cheek meats, shank meats, heart meats and the like. Various cuts, of course, will change the product.

The meat is first finely divided so that it may be effectively subjected to an extraction treatment. Conventional meat choppers or cutters may be used for mechanical disintegration, for instance a grinder having a 1/8 to 3/16 inch plate.

The sub-divided meat may be first extracted with water in a conventional manner, such as employed for the preparation of meat extract. Approximately two parts by volume of hot water is added to one part of meat. The water-meat mixture is cooked on or near its boiling point for a period of time depending on the amount of extract desired. According to one process, the cooking takes place for approximately one hour, although shorter, or longer, periods may be used.

In the process of the present invention, the extraction with hot water above may be omitted, although it is preferably performed prior to the operations described hereinafter. The water soluble fraction is separated from the insoluble residue, such as by filtering.

After extracting the meat in hot water, the water insoluble residue is washed or showered with fresh hot water to remove occluded, meat soup.

A strong aqueous solution of a mineral acid is then added to the residue, and the mixture is heated under pressure. By this acid treatment, the meat fibers are broken down through the addition of water to the peptide linkages between the individual amino acids of the protein molecules. This frees the amino acids in a soluble form.

The acid treatment step may be conducted 0.5 to 24 hours at a temperature in the range from 100° F. to the boiling point of the mixture. Temperatures near the boiling point are preferred since this reduces the period of treatment. Super atmospheric pressures may be used to reduce the time of treatment. While any strong mineral acid may be used, providing it does not produce undesirable, or toxic, substances, hydrochloric acid is preferred as will be later explained.

Following the treatment with the mineral acid the reaction mixture is partially neutralized by basic compounds. The basic compounds include, for example, any of the alkali metal (except lithium) hydroxides, carbonates, or bicarbonates, although the sodium compounds are preferable.

The partial neutralization is carried out to a point at which the humin is insoluble less than pH 7, for example, at about a pH 6.2. This neutralizes the hydrochloride salts of certain undesirable impurities and renders them insoluble, so that they may be removed. These undesirable impurities are formed during the acid treatment by condensation reactions between amino acids and other substances present in the meat and they must be removed since they impart an undesirable bitter flavor and a black color to the finished product.

The undesirable impurities may be removed by any suitable separation step such as centrifuging or filtering. After separation, the acid insoluble impurities may be washed with a hot concentrated sodium chloride solution to remove meat constituents occluded therein. The acid soluble solution and the wash solution may be combined.

The acid soluble fraction from which the humin has been removed is concentrated by evaporation, expeditiously at reduced pressures, until a large amount of the salt formed by the neutralization of the mineral acid with the basic compound can be crystallized and removed. The concentrated solution of the acid soluble constituents and wash water is removed from the crystallized salt, such as by filtering.

It is preferable to use hydrochloric acid for the hydrolysis, and a sodium compound, such as sodium carbonate or bicarbonate, for neutralization, since the sodium chloride salt formed thereby can be retained desirably in the acid soluble fraction in varying amounts. Certain amounts of the salt improve the flavor of the product.

The acid soluble fraction is further concentrated to a solid phase in an open evaporator pan, or other conventional equipment for the removal of water. Small amounts of flavoring materials may be added prior to evaporation, for instance, sugars, such as glucose, in the amounts of 0.25 to 1.5% to impart a caramelized flavor characteristic of roast or braised meat.

The acid soluble fraction obtained by the foregoing process may be used as a nutritional composition, food supplement, or flavoring agent in the same area that conventional meat extract has been used for many years. It is advantageously combined with meat extract to form a product of improved nutritional benefits and flavor characteristics.

It will be noted that the water soluble and acid soluble fractions may be combined prior to concentration. In some instances, it may even be desirable to combine the water extraction and acid extraction steps in one operation. Thus, the meat may be treated with the mineral acid without any prior hot water extraction.

In order to further illustrate the invention, the following example is given, which is not intended to limit the scope of protection:

*Example I.*—Beef shank meat ground through a 3/16 inch plate was cooked for 60 minutes at 212° F. using two volumes of water to one of meat. The ground cooked meat was then drained and washed briefly with fresh hot water to remove the occluded meat soup. The meat soup and wash water were combined, simmered for a time, skimmed free of fat, filtered and evaporated to 17% moisture content to produce meat extract. The yield of meat extract thus obtained was 3.78 kg. (17% moisture basis) per 100 kg. raw shank meat and the yield of cooked meat obtained after 60 minutes cooking at 212° F. was 76 kg. per 100 kg. raw shank meat.

The residue meat (76 kg.) was then treated with 20% hydrochloric acid (96 kg.) for 18 hours at 250° F. although a lower temperature and a shorter time of heating may be used. After treating with acid, the solubilized meat soup thus obtained was neutralized to pH 6.2 with sodium hydroxide. The partially neutralized solution was then filtered to remove the undesirable impurities which were formed through condensation reactions during the hydrochloric acid treatment. The filter cake thus obtained was washed with hot concentrated sodium chloride solution to remove occluded soluble protein constituents and the filtrate plus wash water was concentrated in a vacuum to permit crystallization of large amounts of the sodium chloride present. The sodium chloride was removed by filtration and the solution of acid soluble meat was evaporated to 17% moisture content. Prior to this final concentration the filtrate was divided into two portions, one was concentrated directly and a small amount of glucose (1.25%) was added to the other portion prior to concentration to impart a cooked or roast flavor.

A yield of 40.45 kg. of the acid soluble fraction and 3.78 kg. of water soluble fraction, a total of 44.23 kg. meat products was obtained from 100 kg. starting weight of raw meat.

Various blends of the water soluble and acid soluble fractions may be prepared in the range from 99%:1% to 1%:99% by weight of each. A number of distinct meat flavors can be produced depending upon the proportions of the water soluble and acid soluble fractions blended within this range. Similar results may be obtained by blending the water soluble and acid soluble fractions prior to concentration. The various blends make it possible to formulate meat flavors best designed for particular food products in which they are to be used.

The blends contain nutritionally essential amino acids found in meat in addition to the water soluble vitamins extracted in the hot water treatment. Thus, the combination of the two fractions produces a product having significant nutritional benefits.

Other modes of applying the principle of the invention may be employed, change being made as regards the details described, provided the features stated in any of the following claims or the equivalent of such be employed.

I, therefore, particularly point out and distinctly claim as my invention:

1. A process for producing meat products which comprises dividing meat into small particles, extracting the water soluble constituents therefrom by contacting the divided meat with hot water to form a water soluble fraction and an insoluble meat residue, separating said insoluble meat residue from said water soluble fraction, subjecting said insoluble meat residue to acid hydrolysis, partially neutralizing said acid hydrolyzate to a pH of about 6.2 so as to render insoluble the impurities containing humin, separating the acid soluble from the acid insoluble impurities containing humin of said partially neutralized acid hydrolyzate, removing at least part of the salt formed by said partial neutralization step in said acid soluble fraction, and combining at least portions of both of said water soluble and acid soluble fractions so that the resultant meat product contains the water soluble vitamins and substantial amounts of the nutritionally essential amino acids.

2. A process for producing meat products which comprises dividing meat into small particles, extracting the water soluble constituents therefrom by contacting the divided meat with hot water to form a water soluble fraction and an insoluble meat residue, separating said insoluble meat residue from said water soluble fraction, evaporating said water soluble fraction to a concentrated form, subjecting said insoluble meat residue to acid hydrolyzate, partially neutralizing said acid hydrolyzate to a pH of about 6.2 in order to render insoluble the impurities containing humin, separating said acid soluble from said acid insoluble impurities of said partially neutralized acid hydrolyzate, removing at least part of the salt formed by said partial neutralization step in said acid soluble fraction, evaporating said acid soluble fraction from which the humin has been removed to a concentrated form, combining at least portions of both of said water soluble and acid soluble fractions so that the resultant meat product contains the water soluble vitamins and substantial amounts of the nutritionally essential amino acids and concentrating the combined fractions to a solid phase.

3. A process for producing meat products which comprises dividing meat into small particles, extracting the water soluble constituents therefrom by contacting the divided meat with hot water to form a water soluble fraction and an insoluble meat residue, separating said insoluble meat residue from said water soluble fraction, subjecting said insoluble meat residue to acid hydrolysis, partially neutralizing said acid hydrolyzate to a pH less than 7 at which the impurities containing humin are insoluble, separating said acid soluble from said acid insoluble impurities of said partially neutralized acid hydrolyzate, removing at least part of the salt formed by said partial neutralization step in said acid soluble fraction, and combining at least portions of both of said water soluble and acid soluble fractions so that the resultant meat product contains the water soluble vitamins and substantial amounts of the nutritionally essential amino acids.

4. A process for producing meat products which comprises dividing meat into small particles, extracting the water soluble constituents therefrom by contacting the divided meat with hot water to form a water soluble fraction and an insoluble meat residue, separating said insoluble meat residue from said water soluble fraction, evaporating said water soluble fraction to a concentrated form, subjecting said insoluble meat residue to acid hydrolysis, partially neutralizing said acid hydrolyzate to a pH of about 6.2 in order to render insoluble the impurities containing humin, separating said acid soluble from said acid insoluble impurities of said partially neutralized acid hydrolyzate, removing at least part of the salt formed by said partial neutralization step in said acid soluble fraction, evaporating said acid soluble fraction from which the humin has been removed to a concentrated form, and combining at least portions of both of said water soluble and acid soluble fractions so that the resultant meat product contains the water soluble vitamins and substantial amounts of the nutritionally essential amino acids.

5. A process for producing meat products which comprises dividing meat into small particles, extracting the water soluble constituents therefrom by contacting the divided meat with hot water to form a water soluble fraction and an insoluble meat residue, separating said insoluble meat residue from said water soluble fraction, evaporating said water soluble fraction to a concentrated form, subjecting said insoluble meat residue to acid hydrolysis, partially neutralizing said acid hydrolyzate to a pH of about 6.2 so as to render insoluble the impurities containing humin, separating said acid soluble from said acid insoluble impurities of said partially neutralized mixture, removing at least part of the salt formed by said partial neutralization step in said acid soluble fraction, and evaporating said acid soluble fraction from which the humin has been removed to a concentrated form.

References Cited in the file of this patent
UNITED STATES PATENTS

| | | |
|---|---|---|
| 1,758,987 | Thomson | May 20, 1930 |
| 2,953,456 | Mohler et al. | Sept. 20, 1960 |